US009019161B1

United States Patent
Billsberry et al.

(10) Patent No.: US 9,019,161 B1
(45) Date of Patent: Apr. 28, 2015

(54) TRI-FIN TCAS ANTENNA

(75) Inventors: Mark Billsberry, Indialantic, FL (US); Shawn Mason, Satellite Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 193 days.

(21) Appl. No.: 13/425,956

(22) Filed: Mar. 21, 2012

(51) Int. Cl.
*H01Q 1/28* (2006.01)
*G01S 13/93* (2006.01)
*G01S 3/02* (2006.01)

(52) U.S. Cl.
CPC .............. *G01S 13/9303* (2013.01); *G01S 3/023* (2013.01)

(58) Field of Classification Search
CPC .................................. H01Q 1/28; H01Q 21/00
USPC .......................................... 343/705, 708, 893
See application file for complete search history.

(56) References Cited

U.S. PATENT DOCUMENTS

| 4,867,393 | A | * | 9/1989 | Faupell et al. | ............... 244/3.22 |
| 5,206,656 | A | * | 4/1993 | Hannan | ......................... 343/705 |
| 6,999,022 | B1 | * | 2/2006 | Vesel et al. | ...................... 342/30 |
| 7,978,121 | B2 | * | 7/2011 | Brandao et al. | ................. 342/30 |
| 2005/0156777 | A1 | * | 7/2005 | King et al. | ...................... 342/29 |
| 2010/0117923 | A1 | * | 5/2010 | Storz | ............................. 343/878 |
| 2010/0271274 | A1 | * | 10/2010 | Gibson et al. | ................. 343/705 |
| 2012/0181374 | A1 | * | 7/2012 | Williams | ..................... 244/3.19 |

* cited by examiner

*Primary Examiner* — Hoanganh Le
(74) *Attorney, Agent, or Firm* — Angel N. Gerdzhikov; Donna P. Suchy; Daniel M. Barbieri

(57) ABSTRACT

A low drag TCAS antenna includes a plurality of broadband antenna elements in a housing having at least three fins. L band radios in the aircraft may utilize the broadband antenna elements, thereby reducing power consumption, cost and aerodynamic inefficiency due to a plurality of antennas protruding from the aircraft.

17 Claims, 4 Drawing Sheets

TRI-FIN TCAS ANTENNA

FIELD OF THE INVENTION

The present invention is directed generally toward traffic collision avoidance system (TCAS) antennas, and more particularly toward TCAS antennas configured for broadband operation.

BACKGROUND OF THE INVENTION

A traffic collision avoidance system (TCAS) is an aircraft collision avoidance system designed to reduce the incidence of mid-air collisions between aircraft. TCAS monitors the airspace around an aircraft for other aircraft equipped with a corresponding active transponder, independent of air traffic control, and warns pilots of the presence of other transponder-equipped aircraft which may present a threat of mid-air collision.

The antennas used by TCAS may include a directional antenna mounted on the top of the aircraft and a directional or omnidirectional antenna on the bottom of the aircraft. This antenna may enable a transponder to receive interrogations at 1030 MHz and reply to the received interrogations at 1090 MHz.

Because TCAS antennas are attached to the exterior surface of an aircraft, drag created by the antenna is a serious concern. TCAS antennas must, therefore, be as streamlined and low-profile as possible. Traditional TCAS antennas employ a low-profile radome configuration. The radome configuration offers a low-profile but generally operates over a very narrow band of approximately 1030 MHz to 1090 MHz; adequate for TCAS only.

In addition to TCAS, aircraft generally include other L-band radios. Because TCAS antennas generally operate in a very narrow band, such antennas are not suitable for use by other L band radios operating outside that narrow band. Aircraft must therefore incorporate additional antennas. Additional antennas and associated cables may cause additional drag, consume power, add weight and add cost.

Consequently, it would be advantageous if an apparatus existed that is suitable for use as a low-drag TCAS antenna, and for integrating various L-band radios in an aircraft.

SUMMARY OF THE INVENTION

Accordingly, the present invention is directed to a novel apparatus for use as a low-drag TCAS antenna, and for integrating various L-band antennas in an aircraft.

One embodiment of the present invention is a TCAS antenna having four directional antenna arrays in a tri-fin antenna housing. Directional antenna arrays are less expensive to manufacture than traditional folded monopole antenna for a TCAS application. In addition, the tri-fin antenna housing provides low drag characteristics.

In another embodiment of the present invention, four directional antenna arrays provide a broadband capability. The four directional antenna arrays may be effective in a frequency range of at least 800 MHz to 1500 MHz.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
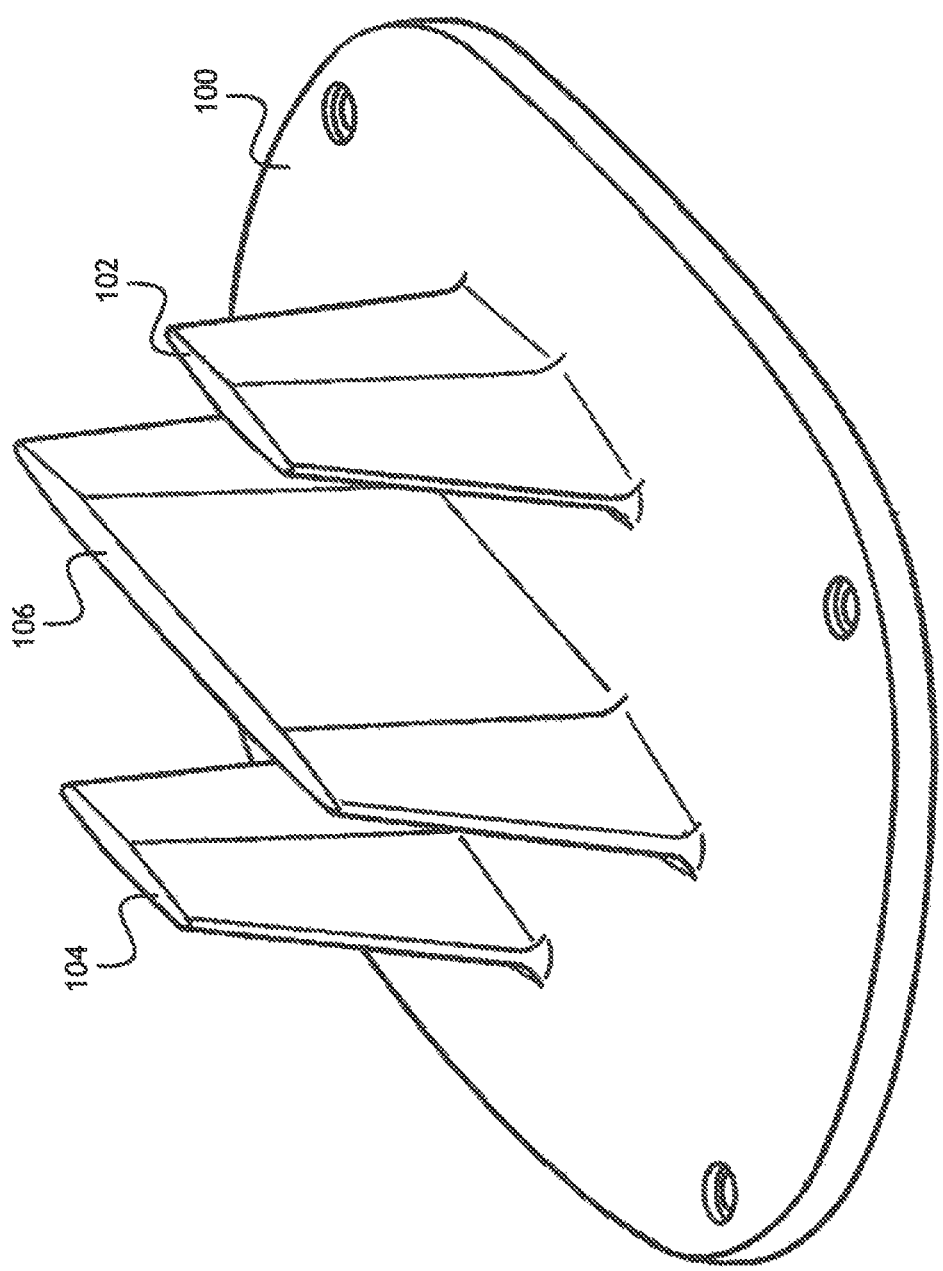
FIG. 1 shows a perspective view of an antenna housing according to the present invention.

Referring to FIG. 1, an antenna housing is shown. The antenna housing may include a base 100. The base 100 may be configured to occupy the same area on the surface of an aircraft ("footprint") as prior art TCAS antennas. The antenna housing may also include three fins 102, 104, 106. The fins 102, 104, 106 may extend perpendicularly from the base 100, and be substantially parallel to each other. The fins 102, 104, 106 may be oriented in the direction of travel of an aircraft to provide the minimum possible drag. Each of the fins 102, 104, 106 may be configured to cover and protect one or more antenna arrays. The fins 102, 104, 106 may be positioned such that a first lateral fin 102 and a second lateral fin 104 are substantially equidistant from a central fin 106, and a line defined by a center point of the first lateral fine 102 and a center point of the second lateral fin 104 substantially intersects a center point of the central fin 106. Each of the fins 102, 104, 106 may extend no more than two inches (approximately five centimeters) from the base 100.

Figure 2:
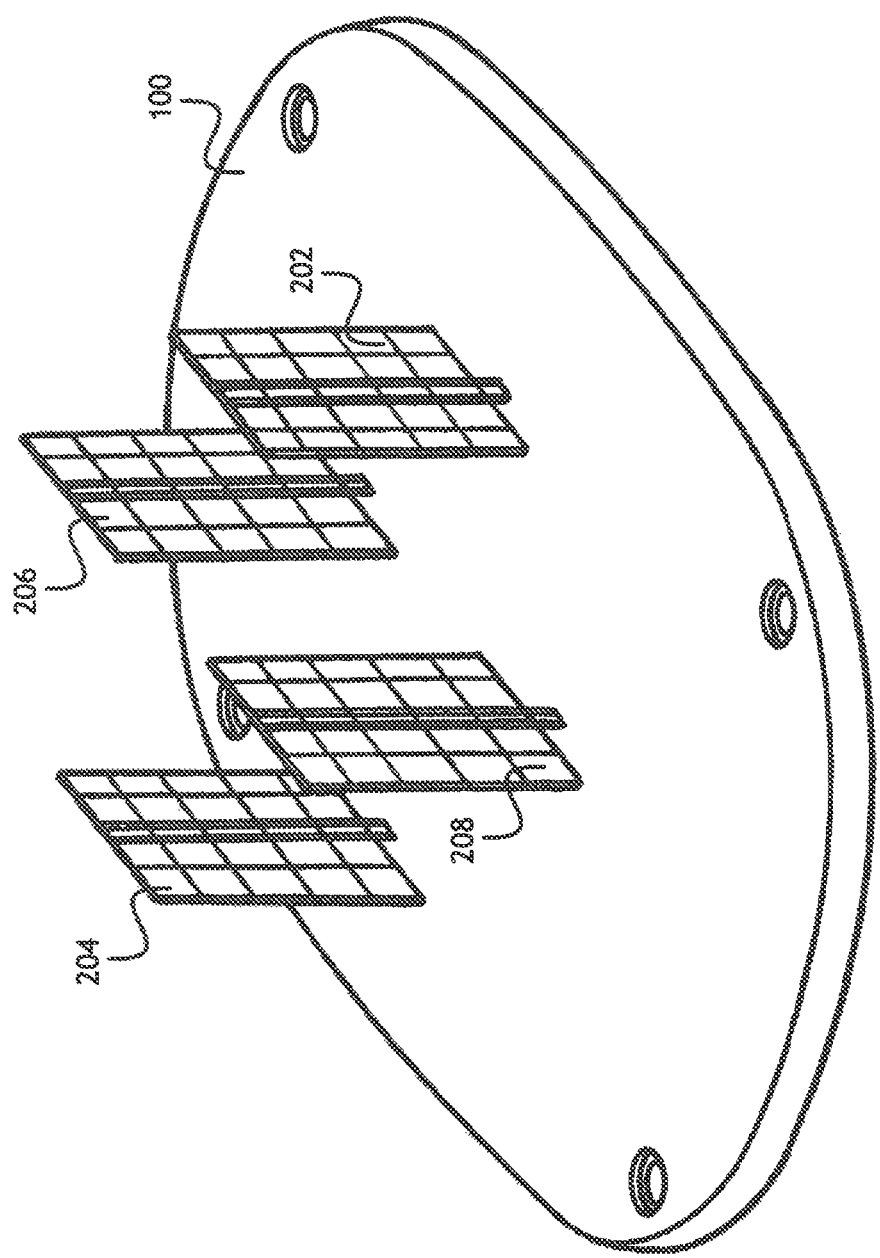
FIG. 2 shows a perspective view of directional antenna array elements according to the present invention.

Referring to FIG. 2, an antenna having four antenna arrays 202, 204, 206, 208 is shown. Each of the antenna elements 202, 204, 206, 208 may protrude perpendicularly from a base 100. The antenna elements 202, 204, 206, 208 may be organized as an array antenna for use in a TCAS system such that signals from a transponder may be effectively determined by a processing device connected to the directional antenna. The point at which each antenna element 202, 204, 206, 208 protrudes from the base 100 may be substantially equidistant from a point on the base 100 defined by the intersection of a line defined by the point of protrusion of a first lateral element 202 and a second lateral element 204, and a line defined by the point of protrusion of a first center element 206 and a second center element 208. For a directional TCAS antenna, the effective distance of antenna elements from the center point may be approximately one quarter of the operative wavelength, or approximately eight centimeters.

Each of the antenna elements 202, 204, 206, 208 may comprise a broadband monopole (blade) antenna. Each antenna element 202, 204, 206, 208 may be configure to operate in a range of at least 800 MHz to 1500 MHz.

Figure 3:
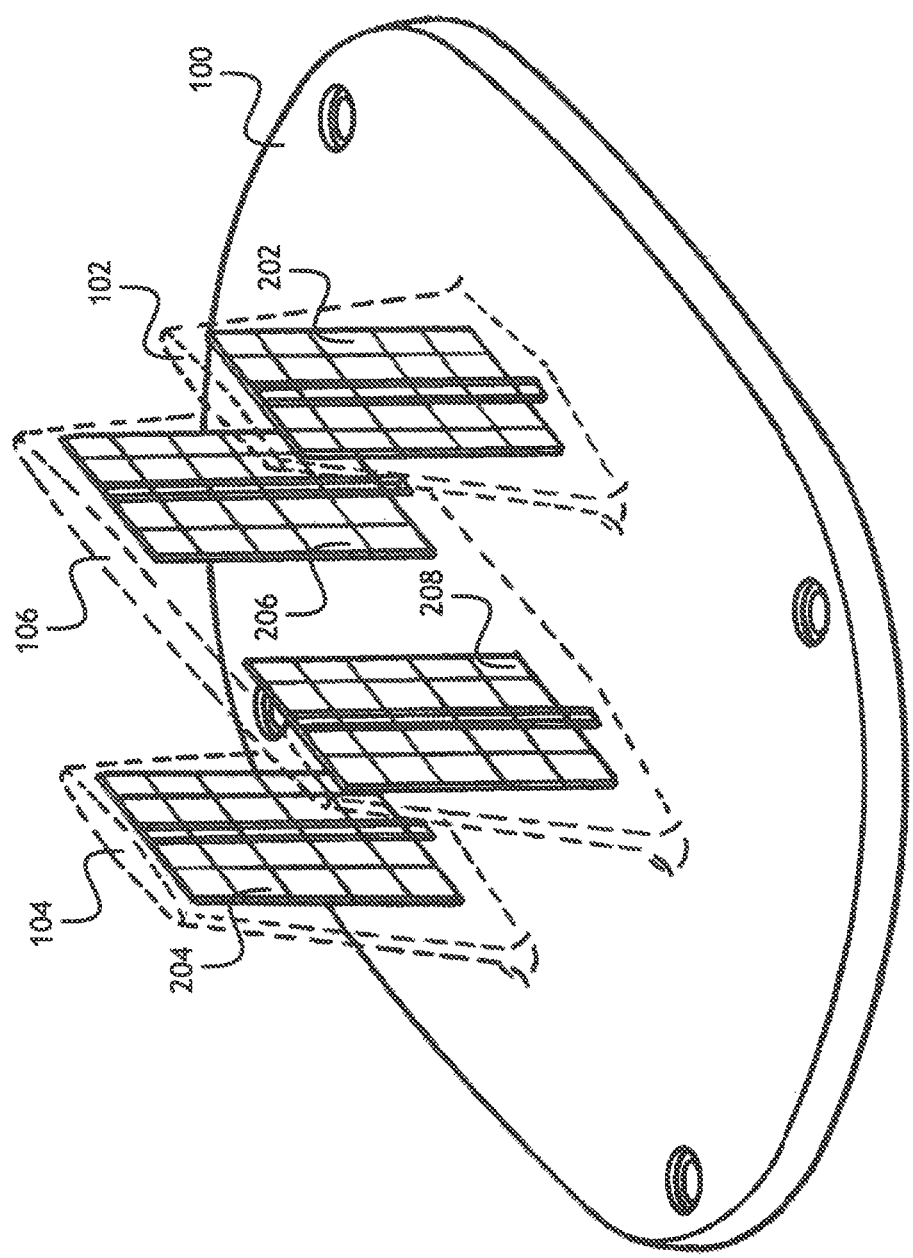
FIG. 3 shows a perspective view of directional antenna array elements as in FIG. 2, inside an antenna housing as in FIG. 1.

Referring to FIG. 3, a directional array antenna having four elements in an antenna housing is shown. The antenna may comprise four antenna elements 202, 204, 206, 208 protruding from a base 100 as in FIG. 2, with each of the four antenna elements 202, 204, 206, 208 covered by a fin 102, 104, 106 as depicted in FIG. 1. A first lateral antenna element 202 may be contained within a first lateral fin 102; a second lateral antenna element 204 may be contained within a second lateral fin 104; and a first center antenna element 206 and a second center antenna element 208 may be contained within a center fin 106. The antenna depicted in FIG. 3 may substitute for a prior art directional TCAS antenna where each antenna element 202, 204, 206, 208 may substitute for a non-broadband antenna element in the prior art TCAS antenna. In addition, an antenna according to the present invention may provide broadband capabilities that a prior art TCAS antenna cannot provide. Furthermore, a TCAS antenna utilizing antenna elements 202, 204, 206, 208 configured as blade antennas may experience improved performance characteristics both in terms of TCAS functionality and in terms of aerodynamic efficiency.

Figure 4:
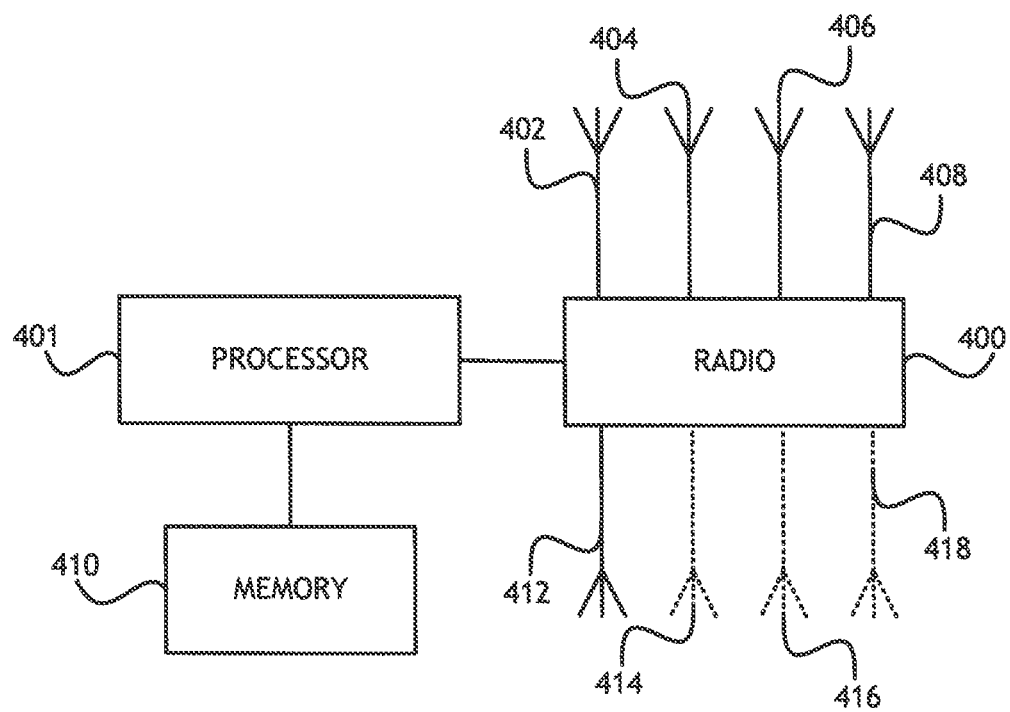
FIG. 4 shows a block diagram of computer system incorporating four directional TCAS antennas.

Referring to FIG. 4, a computer system incorporating four directional TCAS antenna elements 402, 404, 406, 408 configured as a TCAS top antenna, and four TCAS antenna elements 412, 414, 416, 418 configured as a TCAS bottom antenna is shown. The computer system may comprise a processor 401 connected to memory 410 and to a radio 400. The radio 400 may be a TCAS radio. The radio 400 may be connected to four TCAS elements 402, 404, 406, 408 configured as a TCAS top directional antenna. At least one of the four TCAS elements 402, 404, 406, 408 may be further configured as a broadband antenna such as a blade antenna. Furthermore, the radio 400 may be connected to at least one TCAS omnidirectional antenna 412 configured as a TCAS bottom antenna. Alternatively, the radio 400 may be connected to four TCAS elements 412, 414, 416, 418 configured as a TCAS directional bottom antenna. At least one of the four TCAS elements 412, 414, 416, 418 may be further configured as a broadband antenna such as a blade antenna. It may be appreciated by those skilled in the art that in certain configurations, one or more of the antenna elements 414, 416, 418 comprising a TCAS bottom antenna may be optional. Specifically, where the TCAS bottom antenna is configured as an omnidirectional antenna, a single antenna element 412 may be sufficient as a TCAS bottom antenna.

The processor 401 may comprise a software defined radio configured to transmit and receive signals in the L band through one or more of the four TCAS elements 402, 404, 406, 408 comprising a TCAS top directional antenna, or one or more of the TCAS elements 412, 414, 416, 418 comprising a TCAS bottom antenna. In one embodiment, the software defined radio and TCAS elements 402, 404, 406, 408, 412, 414, 416, 418 are configured to operate in a frequency range greater than 1090 MHz; in another embodiment, the software defined radio and TCAS elements 402, 404, 406, 408, 412, 414, 416, 418 are configured to operate in a frequency range less than 1030 MHz.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An antenna apparatus comprising:
an antenna housing comprising at least three fins; and
four antenna elements,
wherein:
a first antenna element and a second antenna element are oriented in a first plane and housed within a first fin of the at least three fins;
a third antenna element is oriented in a second plane parallel to the first plane and is substantially equidistant from the first antenna element and the second antenna element;
a fourth antenna element is oriented in a third plane parallel to the first plane and is substantially equidistant from the first antenna element and the second antenna element;
the third antenna element and the fourth antenna element define a line bisecting the distance between the first antenna element and the second antenna element;
the four antenna elements are configured as a directional antenna;
the four antenna elements are further configured to operate in an L band; and
the antenna apparatus conforms to specifications for a directional antenna in a Traffic Collision Avoidance System (TCAS).

2. The apparatus of claim 1, wherein the antenna housing further comprises a base, wherein:
the at least three fins extend perpendicularly from the base; and
the at least three fins are substantially parallel to each other.

3. The apparatus of claim 2, wherein each of at least three fins extends no more than two inches from the base.

4. The apparatus of claim 1, wherein at least one of the four antenna elements is configured as a broadband antenna.

5. The apparatus of claim 4, further comprising:
a processor connected to the four antenna elements; and
memory connected to the processor,
wherein the processor is configured to function as an L band radio.

6. The apparatus of claim 5, wherein the L band radio operates in a frequency range greater than 1090 MHz.

7. The apparatus of claim 5, wherein the L band radio operates in a frequency range less than 1030 MHz.

8. A software defined radio comprising:
a processor;
memory connected to the processor; and
four planar antenna elements, a first antenna element and a second antenna element oriented in a first plane and housed within a first protective fin, a third antenna element oriented in a second plane parallel to the first plane and substantially equidistant from the first antenna element and the second antenna element, and a fourth antenna element oriented in a third plane parallel to the first plane and substantially equidistant from the first antenna element and the second antenna element, wherein the third antenna element and the fourth antenna element define a line bisecting the distance between the first antenna element and the second antenna element, each connected to the processor,
wherein:
the four antenna elements are configured as a directional antenna conforming to specifications for a Traffic Collision Avoidance System (TCAS);
at least one of the four antenna elements is configured as a broadband antenna; and
the software defined radio is configured as a traffic collision avoidance system.

9. The apparatus of claim 8, wherein the software defined radio is configured to operate in a frequency range greater than 1090 MHz.

10. The apparatus of claim 8, wherein the software defined radio is configured to operate in a frequency range less than 1030 MHz.

11. The apparatus of claim 8, wherein each of the third antenna element and the fourth antenna element is housed inside a separate protective fin.

12. The apparatus of claim 8, wherein the software defined radio is configured for installation in an aircraft, and wherein the the four antenna elements are configured to protrude from an outer skin of the aircraft.

13. The apparatus of claim 12, wherein each antenna element is configured to extend no more than two inches from the outer skin of the aircraft.

14. An antenna apparatus comprising a plurality of broadband antenna elements, wherein:

the plurality of broadband antenna elements comprises four antenna elements, a first antenna element and a second antenna element oriented in a first plane and housed within a first protective fin, a third antenna element oriented in a second plane parallel to the first plane and substantially equidistant from the first antenna element and the second antenna element, and a fourth antenna element oriented in a third plane parallel to the first plane and substantially equidistant from the first antenna element and the second antenna element, wherein the third antenna element and the fourth antenna element define a line bisecting the distance between the first antenna element and the second antenna element;

the plurality of broadband antenna elements are configured as a directional antenna conforming to specification for a Traffic Collision Avoidance System (TCAS); and each of the plurality of broadband antenna elements is configured to be a broadband monopole antenna.

15. The apparatus of claim 14, wherein each of the broadband antenna elements is configured to protrude from an outer surface of an aircraft by no more than two inches, and to be oriented in a direction of travel of the aircraft.

16. The apparatus of claim 15, wherein each of the broadband antenna elements is further configured to protrude from a point equidistant from a point on the outer surface of the aircraft.

17. The apparatus of claim 15, wherein each of the plurality of broadband antenna element is configured to operate in a frequency range within the L band, and at least one of greater than 1090 MHz and less than 1030 MHz.

* * * * *